(12) United States Patent
Furusawa et al.

(10) Patent No.: US 10,483,516 B2
(45) Date of Patent: Nov. 19, 2019

(54) ELECTRICITY STORAGE MODULE AND ELECTRICITY STORAGE PACK

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Ken Furusawa, Mie (JP); Hitoshi Takeda, Mie (JP); Ryoya Okamoto, Mie (JP); Tetsuji Tanaka, Mie (JP); Hiroki Hirai, Mie (JP)

(73) Assignees: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-Shi, Osaka (JP)

( * ) Notice: Subject to any disclaimer, the term of this patent is extended or adjusted under 35 U.S.C. 154(b) by 127 days.

(21) Appl. No.: 15/937,933

(22) Filed: Mar. 28, 2018

(65) Prior Publication Data

US 2019/0103594 A1    Apr. 4, 2019

(30) Foreign Application Priority Data

Apr. 18, 2017    (JP) .................................. 2017-081861

(51) Int. Cl.
  *H01M 2/20*    (2006.01)
  *H01M 2/10*    (2006.01)
  *H01M 10/42*   (2006.01)

(52) U.S. Cl.
  CPC .......... *H01M 2/206* (2013.01); *H01M 2/1077* (2013.01); *H01M 10/425* (2013.01); *H01M 10/4207* (2013.01); *H01M 2220/20* (2013.01)

(58) Field of Classification Search
  CPC ............... H01M 2/206; H01M 2/1016; H01M 10/4207; H01M 10/425; H01M 2/1077;
  (Continued)

(56) References Cited

U.S. PATENT DOCUMENTS

| | | | | |
|---|---|---|---|---|
| 5,147,985 A | * | 9/1992 | DuBrucq | ............... H01L 23/58 |
| | | | | 174/250 |
| 6,146,788 A | * | 11/2000 | Ikeda | ................... H01M 2/206 |
| | | | | 429/121 |
| 2017/0352857 A1 | | 12/2017 | Kuboki et al. | |

FOREIGN PATENT DOCUMENTS

JP    05-070123    *    9/1993    ............... H02G 3/16

* cited by examiner

*Primary Examiner* — Cynthia K Walls
(74) *Attorney, Agent, or Firm* — Reising Ethington, P.C.

(57) ABSTRACT

An electricity storage module unit that can improve installation work efficiency, and that can be used to build an electricity storage pack that is versatile in terms of installation. An electricity storage module unit is provided with an electricity storage module that includes a plurality of electricity storage elements, and the electricity storage module unit includes: a wiring member that is connected to the electricity storage module; a wiring connection part that connects the wiring member to the wiring member of another electricity storage module unit or to an external electrical component; and a unit base plate on which the electricity storage module is mounted. The unit base plate has a plurality of routing grooves that allow the wiring member to be routed such that a direction in which the wiring member is routed is changeable.

6 Claims, 9 Drawing Sheets

(58) Field of Classification Search
CPC ... H01M 10/04; H01M 2/202; H01M 2220/20
See application file for complete search history.

ELECTRICITY STORAGE MODULE AND ELECTRICITY STORAGE PACK

CROSS REFERENCE TO RELATED APPLICATIONS

This application claims the priority of Japanese patent application JP2017-081861 filed on Apr. 18, 2017, the entire contents of which are incorporated herein.

TECHNICAL FIELD

The technology disclosed in the present specification relates to an electricity storage module unit, and an electricity storage pack that is provided with the electricity storage module unit, and particularly to an electricity storage module unit and an electricity storage pack that are provided with an electricity storage module that includes a plurality of electricity storage elements.

BACKGROUND ART

Conventionally, an electricity storage pack disclosed in JP 2016-119240A is known as an electricity storage pack that is provided with an electricity storage module that includes a plurality of electricity storage elements. JP 2016-119240A discloses an electricity storage pack in which an electricity storage module, protection members for protecting the electricity storage module (a relay unit, a current detection component, a fuse, and so on), voltage signal lines, and output bus bars are disposed on a single base component (base plate). JP 2016-119240A discloses technology for downsizing an electricity storage pack by routing voltage signal lines in a space between the electricity storage module and the base component.

JP 2016-119240A is an example of related art.

SUMMARY

However, according to the above-described technology, the electricity storage pack has a configuration in which components such as the electricity storage module and the protection members are integrated into one piece and are installed on the single base plate. Therefore, if the number of electricity storage modules is increased, the size of the electricity storage pack increases, and the weight of the electricity storage pack also increases. As a result, the transport efficiency of the electricity storage pack, and work efficiency at the time of installation of the electricity storage pack decrease. Also, since the electricity storage pack has such an integrated configuration, the electricity storage pack requires a predetermined amount of space as installation space for the electricity storage pack, and there is no flexibility regarding installation of the electricity storage pack. Therefore, there has been a demand for an electricity storage module that can improve installation work efficiency and that is versatile in terms of installation.

The technology disclosed in the present specification has been completed in view of the above-described situation, and provides an electricity storage module unit that can improve installation work efficiency, and that can be used to build an electricity storage pack that is versatile in terms of installation.

The electricity storage module unit disclosed in the present specification is an electricity storage module unit that is provided with an electricity storage module that includes a plurality of electricity storage elements, the electricity storage module unit including: a wiring member that is connected to the electricity storage module; a wiring connection part that connects the wiring member to the wiring member of another electricity storage module unit or to an external electrical component; and a unit base plate that is a base plate on which the electricity storage module is mounted, and that has a plurality of routing grooves that allow the wiring member to be routed such that a direction in which the wiring member is routed is changeable.

With this configuration, it is possible to build an electricity storage pack that has a predetermined capacity, by simply connecting a predetermined number of electricity storage module units via wiring connection parts. In this regard, it is possible to transport the electricity storage pack by separately transporting each of the electricity storage module units. Also, it is possible to flexibly route the wiring member in each base plate, using the plurality of routing grooves. In addition, it is possible to connect electricity storage module units that are located away from each other, to each other via a cable that connects the respective wiring connection parts to each other. Therefore, using an electricity storage module unit with this configuration, it is possible to build an electricity storage pack that can improve installation work efficiency and that is versatile in terms of installation.

In the above-described electricity storage module unit, the wiring member may include: a first wiring connection part that connects the signal line to the other electricity storage module unit or to the external electrical component; and a second wiring connection part that connects the inter module bus bar and the output bus bar to the other electricity storage module unit or to the external electrical component.

With this configuration, a signal line, an inter-module bus bar, and an output bas bar are provided in each individual electricity storage module unit. Therefore, it is possible to build an electricity storage pack from a plurality of electricity storage module units by simply connecting the respective first wiring connection parts and second wiring connection parts of the electricity storage module units. That is, it is unnecessary to route a wiring member such as the signal line to assemble the electricity storage pack, and thus it is possible to reduce the man-hours required to assemble the electricity storage pack.

In the above-described electricity storage module unit, the first wiring connection part may be constituted by a connector to which the signal line is connected, and the second wiring connection part may be constituted by the inter-module bus bar and a bolt fastening hole that is formed in an end portion of the output bas bar.

With this configuration, it is possible to connect two electricity storage module units that are adjacent to each other, or an electricity storage module unit and an external electrical component that are adjacent to each other, to each other using bolts or connectors, for example. Therefore, it is possible to connect two electricity storage module units that are adjacent to each other, to each other using a simple configuration, and to connect the electricity storage module units to general-purpose electronic components.

The electricity storage pack disclosed in the present specification is an electricity storage pack that includes a plurality of electricity storage module units according to any one of the above-described electricity storage module units, the plurality of electricity storage module units being connected to each other.

With this configuration, when mounting the electricity storage pack onto a vehicle or the like, it is possible to separately transport and mount each electricity storage module unit. Thus, it is possible to build an electricity storage pack that can improve installation work efficiency and that is versatile in terms of installation.

The above-described electricity storage pack may further include: a junction box that is the external electrical component, and that is connected to any one of the electricity storage module units and on which a protection member that protects the electricity storage module is mounted. The junction box may include a component base plate on which the protection member is mounted, and the component base plate may include: a component's connection part that is connected to the wiring connection part of the electricity storage module unit; a component's wiring member that is connected to the wiring member via the component's connection part; and a plurality of routing grooves that allow the component's wiring member to be routed such that a direction in which the component's wiring member is routed is changeable.

With this configuration, it is possible to flexibly route the component's wiring member, and therefore the connection position at which the component base plate is connected to the electricity storage module unit is not fixed. Thus, it is possible to connect the component base plate to any position of the unit base plate depending on how the wiring member of the electricity storage module unit is routed.

Also, the above-described electricity storage pack may further include: a connection cable that connects the wiring connection parts of different electricity storage module units to each other.

With this configuration, it is possible to decentralize the electricity storage module units, using the connection cable, and thus it is possible to realize decentralized installation of the electricity storage pack.

With the electricity storage module unit according to the present application, it is possible to build an electricity storage pack that can improve installation work efficiency and that is versatile in terms of installation.

EMBODIMENTS

Figure 1:
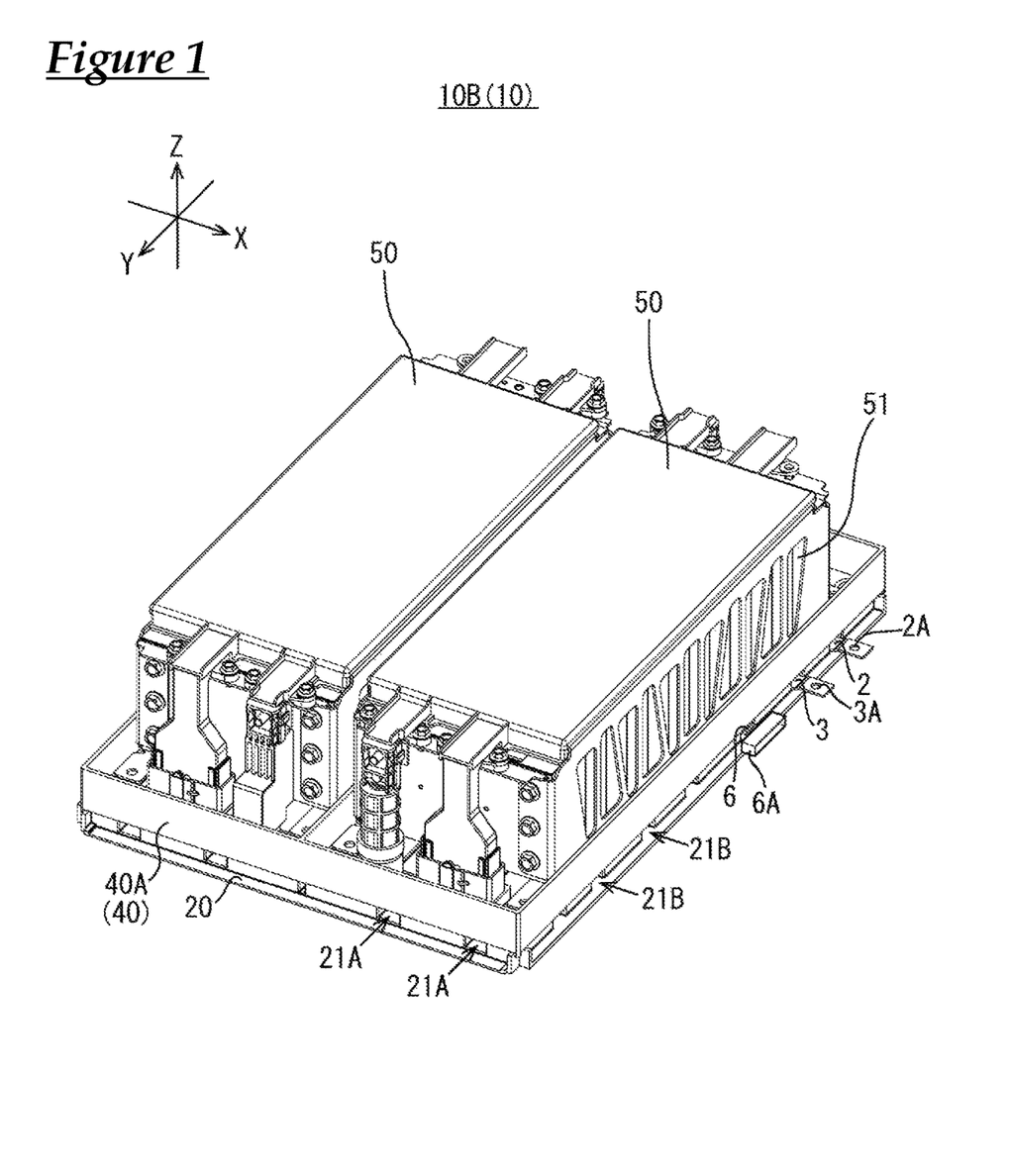
FIG. 1 is a perspective view showing an electricity storage module unit according to an embodiment.

The following describes an embodiment of the present application with reference to FIGS. 1 to 7. An electricity storage pack 100 according to the present embodiment is mounted on a vehicle such as an electric vehicle, a hybrid vehicle, or an automobile (not shown). Note that the electricity storage pack 100 is not necessarily applied by being mounted on a vehicle. In the following description, the direction indicated by the arrow X in FIG. 1 is denoted as a direction to the right, the direction indicated by the arrow Y in FIG. 1 is denoted as a forward direction, and the direction indicated by the arrow Z in FIG. 1 is denoted as an upward direction.

Figure 2:
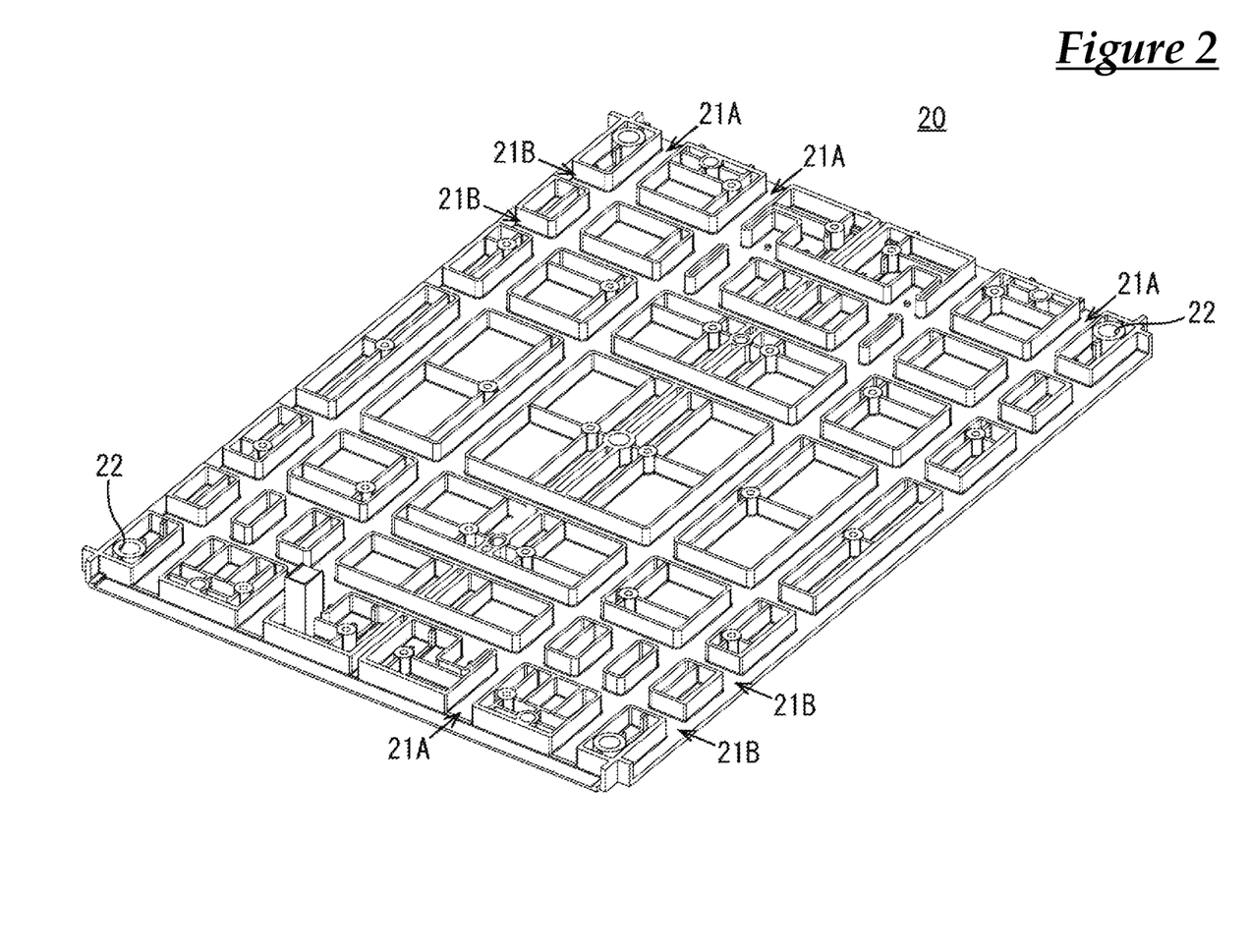
FIG. 2 is a perspective view showing a unit base plate.
Figure 3:
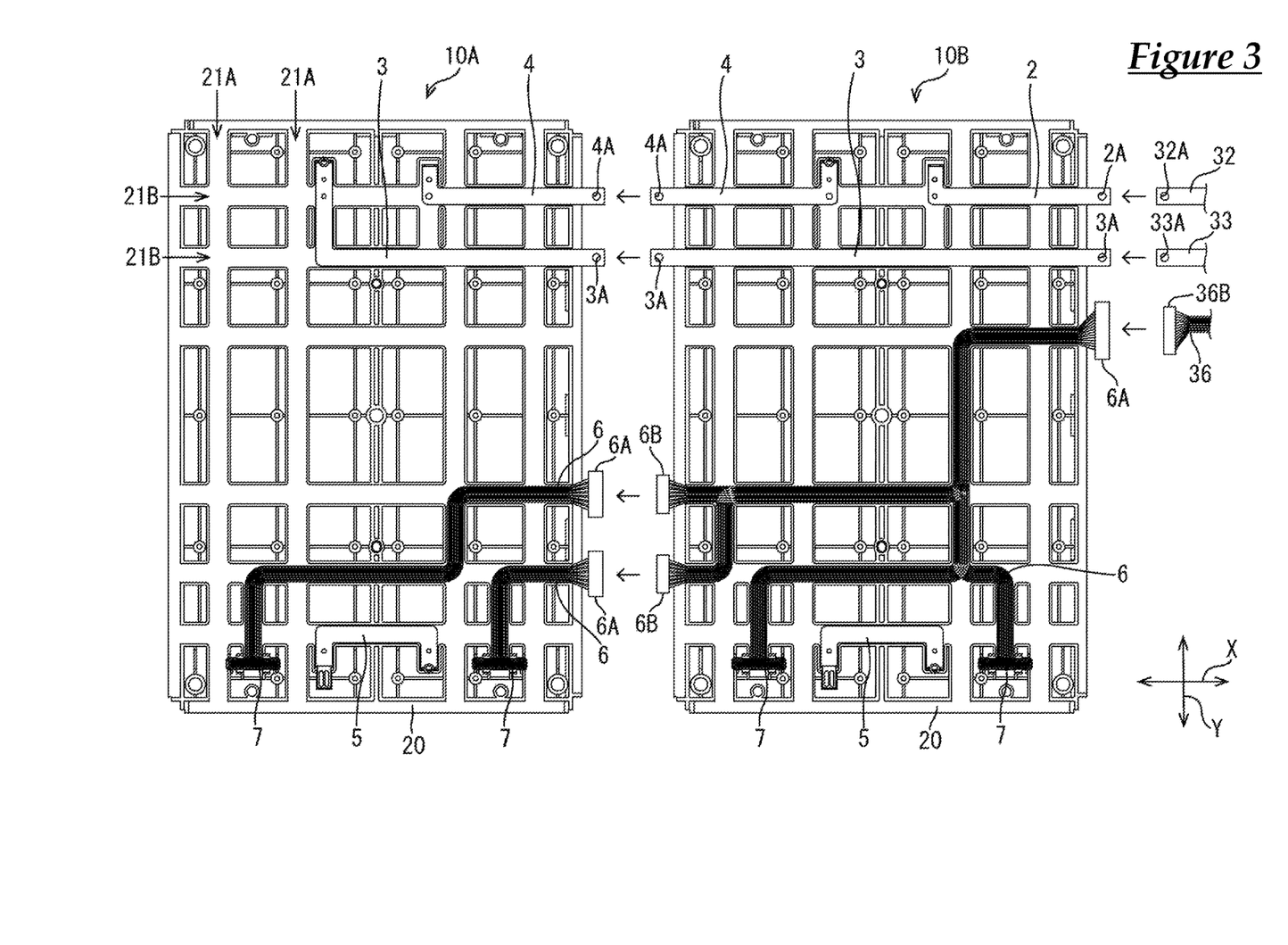
FIG. 3 is a plan view showing an example of routing of wiring members on the unit base plate.

As shown in FIGS. 1 to 3, an electricity storage module unit 10 mainly includes electricity storage modules 50, an insulation protector 40A, wiring members (2, 3, 4, 5, and 6), wiring connection parts (2A, 3A, 4A, 6A, and 6B), and a unit base plate 20. Although the present embodiment describes an example in which the electricity storage module unit 10 includes two electricity storage modules 50, the number of electricity storage modules 50 included in the electricity storage module unit 10 is not limited to two.

Each electricity storage module 50 includes a plurality of electricity storage elements 51 that are connected in series. The electricity storage elements 51 in the present embodiment are lithium-ion batteries, for example. Note that the electricity storage elements 51 are not limited to lithium-ion batteries.

Figure 6:
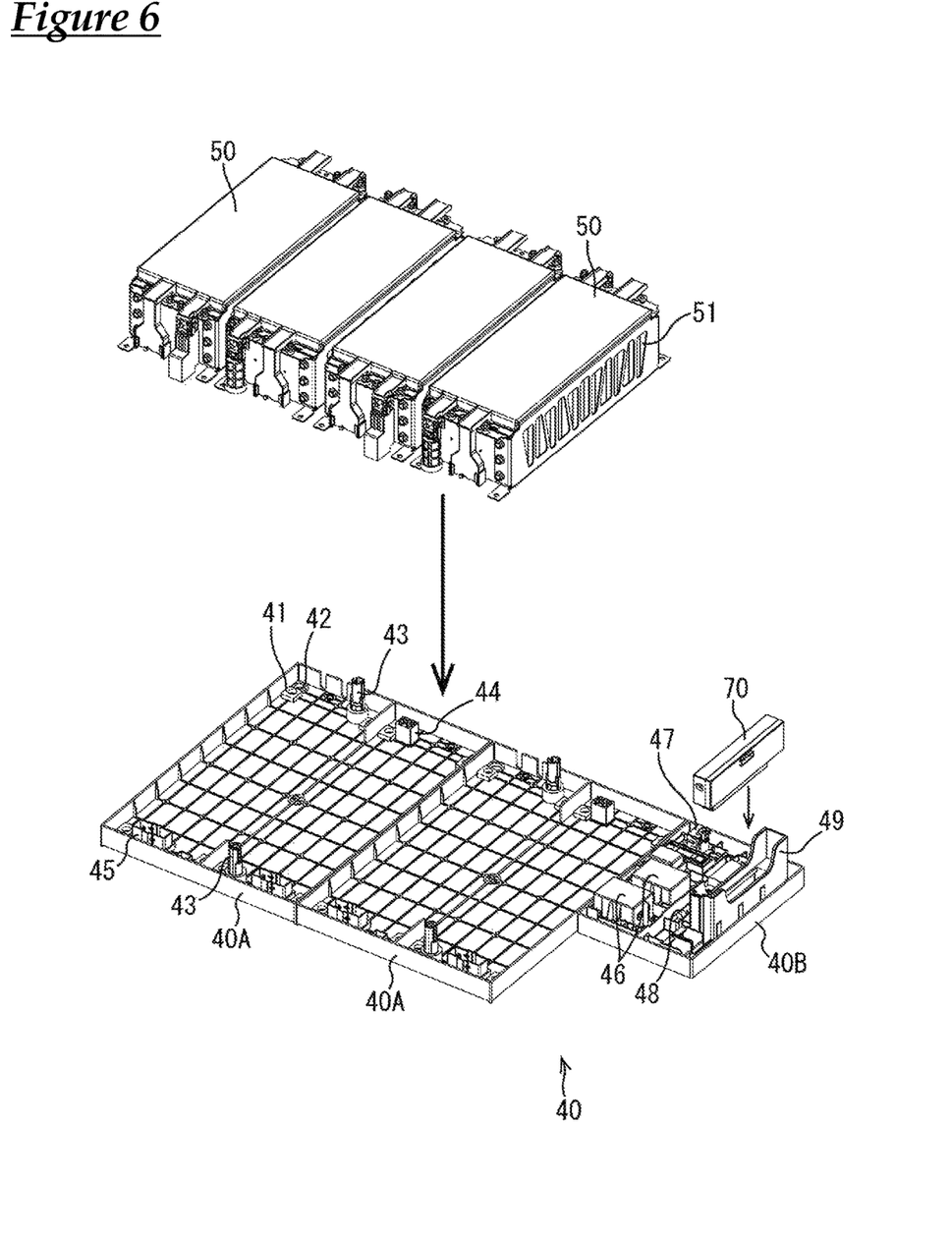
FIG. 6 is an exploded perspective view of a portion of the electricity storage pack.

The insulation protectors 40A are made of a synthetic resin, for example. As shown in FIG. 6, each insulation protector 40A includes screw holes 41 for fixing the electricity storage modules 50 with bolts or the likes, through holes 42 for fixing the insulation protector 40A to the unit base plate 20, holes (tubular holes 43 and rectangular pillar-shaped holes 44) that allow bus bars described below to pass therethrough, and connector holding parts 45. As shown in FIG. 1, two electricity storage modules 50 are mounted on each insulation protector 40A.

As shown in FIG. 3, each unit base plate 20 has a rectangular shape in plan view, and one or more electricity storage modules 50 (two in the present embodiment) are mounted on each unit base plate 20. Also, as shown in FIG. 2, a unit base plate 20 has a plurality of unit routing grooves (21A and 21B) that allow the wiring members (2, 3, 4, 5, and 6) to be routed such that directions in which the wiring members are routed are changeable. Also, through holes 22 for fixing an electricity storage module unit 10 to a mounting place are respectively formed in the four corners of each unit base plate 20.

As shown in FIGS. 2 and 3, the unit routing grooves (21A and 21B) are arranged so as to form a grid shape. That is, the unit routing grooves (21A and 21B) include a plurality of unit vertical routing grooves (routing grooves) 21A that extend in the top-bottom direction (the direction indicated by the arrow Y) in FIG. 3, and a plurality of unit horizontal routing grooves (routing grooves) 21B that extend in the left-right direction (the direction indicated by the arrow X) in FIG. 3.

As shown in FIG. 3, the wiring members (2, 3, 4, 5, and 6) include: inter-module bus bars (4 and 5) that connect electricity storage modules 50 that are adjacent to each other; output bus bars (2 and 3) for drawing electric power from the electricity storage modules 50; and signal lines 6 through which signals related to the states of the electricity storage modules 50 are transmitted. Note that the signal lines 6 in the present embodiment are voltage detection lines for detecting voltages across the electricity storage elements 51. One of the output bus bars (2 and 3) is connected to the positive electrode of an electricity storage module 50, and the other is connected to the negative electrode of the same.

The wiring connection parts (2A, 3A, 4A, 6A, and 6B) connect the wiring members (2, 3, 4, and 6) to the wiring members of another electricity storage module unit 10 or to an external electrical component.

Specifically, the wiring connection parts (2A, 3A, 4A, 6A, and 6B) include: first wiring connection parts that connect the signal lines 6 to another electricity storage module unit 10 or to an external electrical component; and second wiring connection parts that connect the inter-module bus bar 4 and the output bus bars (2 and 3) to another electricity storage module unit 10 or to an external electrical component.

In the present embodiment, as shown in FIG. 3, the first wiring connection parts are constituted by connectors (6A and 6B) to which the signal lines 6 are connected, and the second wiring connection parts are constituted by bolt fastening holes (2A, 3A, and 4A) that are formed in end portions of the inter-module bus bar 4 and the output bus bars (2 and 3). Here, for example, the connectors 6A are female connectors, and the connectors 6B are male connectors.

Figure 4:
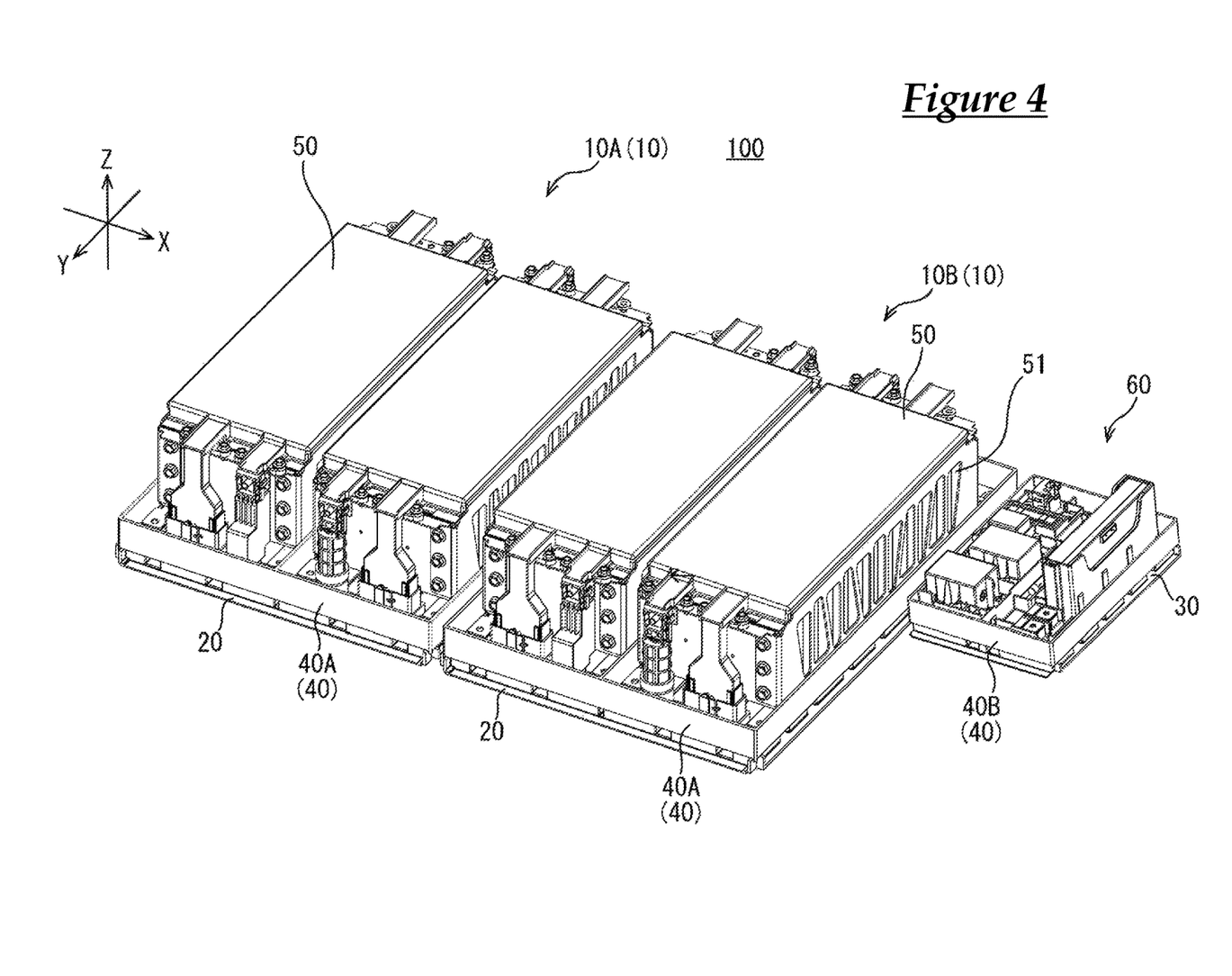
FIG. 4 is a perspective view showing an electricity storage pack according to an embodiment.

Next, the following describes the electricity storage pack 100 according to the present embodiment with reference to FIGS. 4 to 7. As shown in FIG. 4, the electricity storage pack 100 mainly includes a plurality of (two in the present embodiment) electricity storage module units (10A and 10B), and a junction box 60. Note that, as shown in FIG. 3, the electricity storage module unit 10A and the electricity storage module unit 10B are only different in how the wiring members (2, 3, 4, 5, and 6) are routed on the unit base plates 20. Therefore, in the following description, the electricity storage module unit 10A and the electricity storage module unit 10B are denoted as electricity storage module units 10 when there is no need to distinguish them from each other.

The junction box 60 is connected to one of the electricity storage module units 10, and protection members such as relays that protect the electricity storage modules 50 are mounted on the junction box 60. Note that the junction box 60 is an example of an external electrical component, and the external electrical component is not limited to the junction box 60.

As shown in FIG. 4, the junction box 60 includes an insulation protector 40B and a component base plate 30. As shown in FIG. 6, relays 46, a current detector 47, a fuse 48, and so on, which are protection members, are attached to the insulation protector 40B. Also, a connector socket 49 to which a connector 70, which is connected to an ECU or the like, is attached to the insulation protector 40B.

Figure 5:
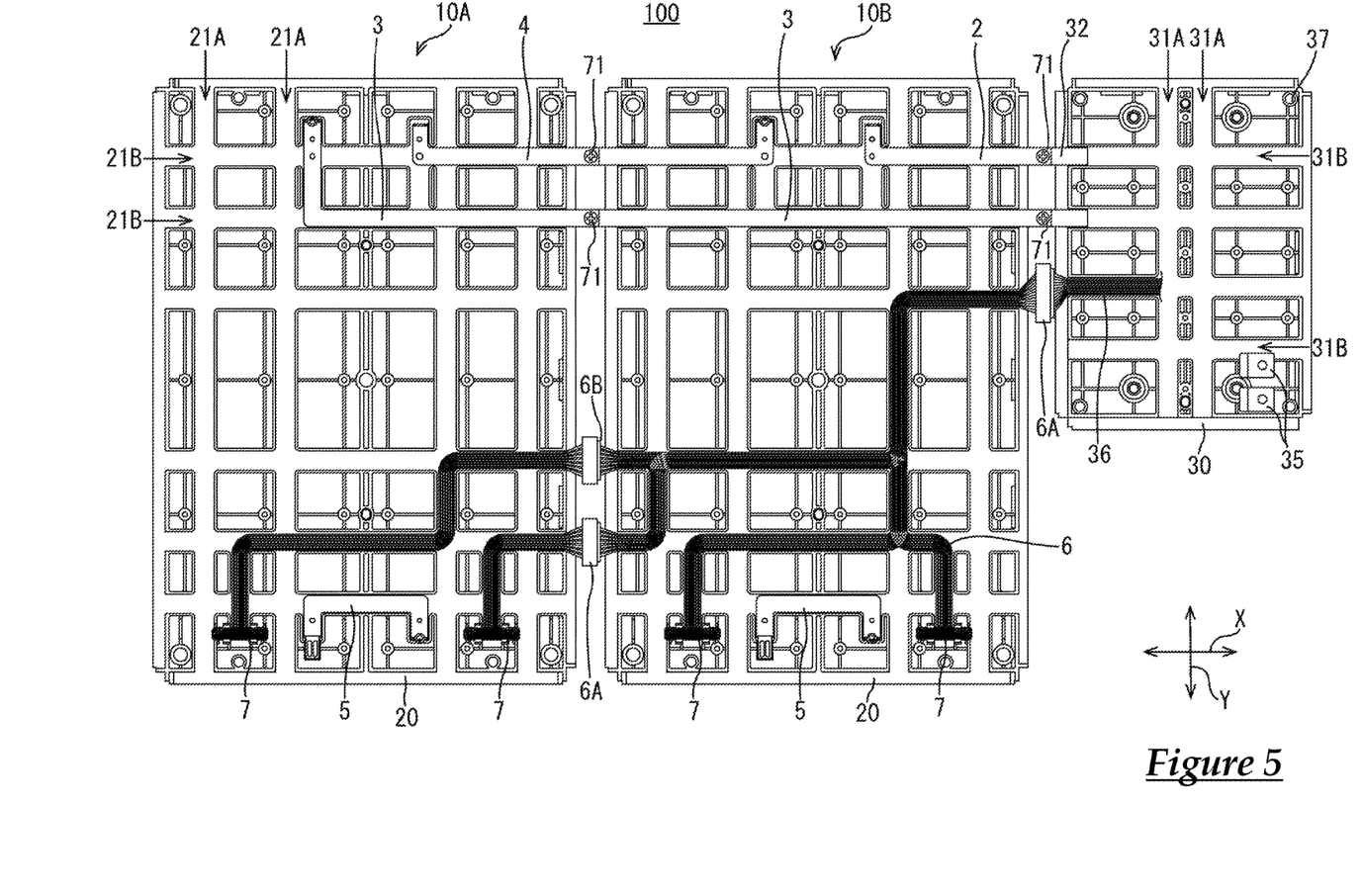
FIG. 5 is a plan view showing a base plate structure of the electricity storage pack.

As shown in FIG. 5, the component base plate 30 has a rectangular shape in plan view, and is electrically connected to the unit base plate 20. As described above, for example, protection members for protecting the electricity storage module 50 are mounted on the component base plate 30 using the insulation protector 40B. Also, the component base plate 30 is provided with electrode terminals 35 for outputting electrical power from electricity storage modules 50, and attachment holes 37.

Also, as with the unit base plate 20, the component base plate 30 has a plurality of routing grooves (31A and 31B) that allow component's wiring members (32, 33, and 36) to be routed such that directions in which the component's wiring members are routed are changeable. The component's wiring members (32, 33, and 36) include bus bars (32 and 33) that are connected to the output bus bars (2 and 3), and a component's signal line 36 that is connected to a signal line 6 (see FIG. 3).

Figure 7:
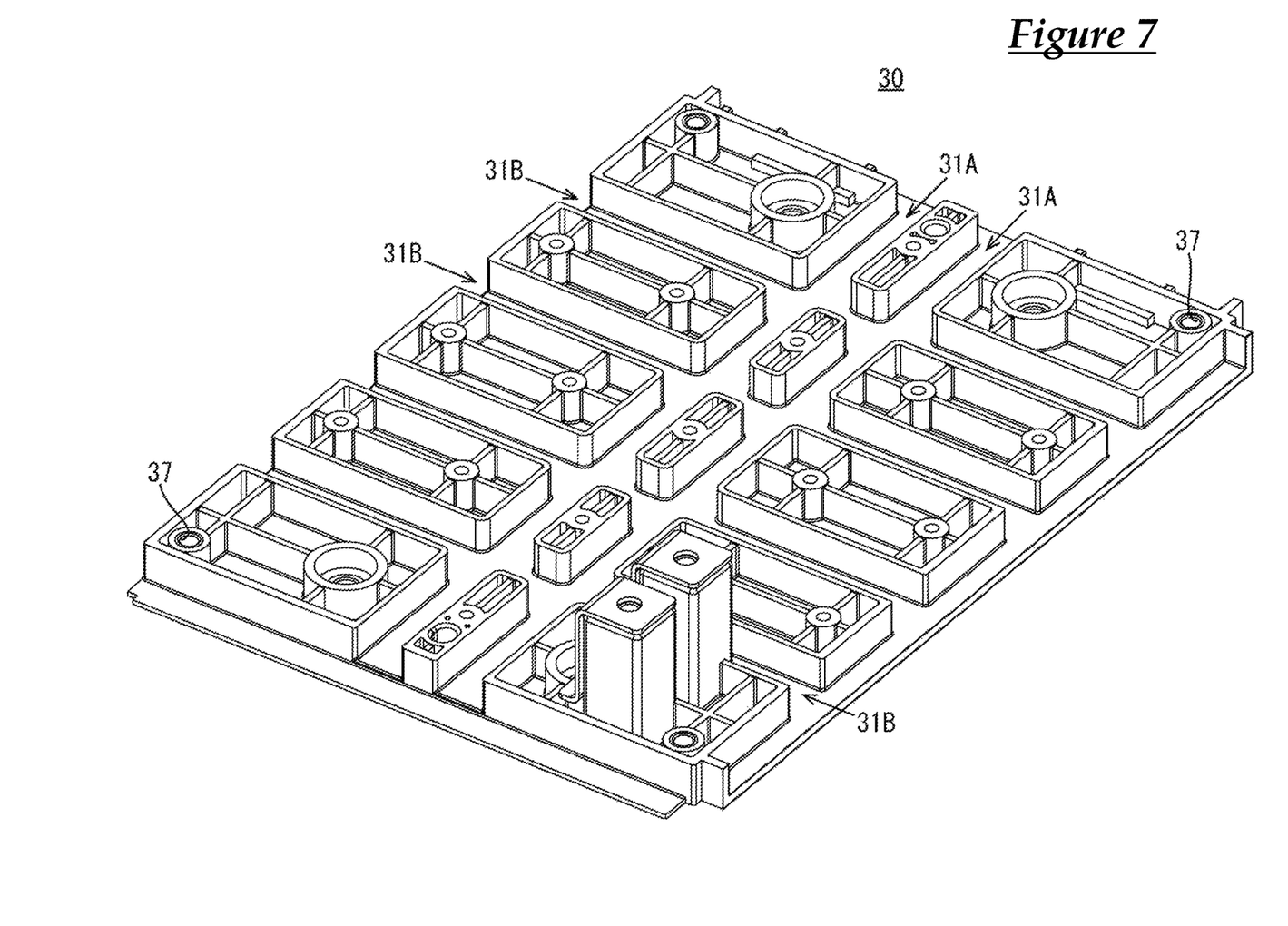
FIG. 7 is a perspective view showing a component base plate.

As shown in FIGS. 5 and 7, the component's routing grooves (31A and 31B) are arranged so as to form a grid shape, as with the routing grooves (21A and 21B) of the unit base plate 20. That is, the component's routing grooves (31A and 31B) include a plurality of vertical routing grooves 31A that extend in the top-bottom direction (the direction indicated by the arrow Y) in FIG. 5, and a plurality of horizontal routing grooves 31B that extend in the left-right direction (the direction indicated by the arrow X) in FIG. 5.

Also, as shown in FIG. 3, the component base plate 30 includes component's connection parts (32A, 33A, and 36B) that are connected to the wiring connection parts (2A, 3A, and 6A) of the electricity storage module units 10. In the present embodiment, the component's connection parts (32A and 33A) are bolt fastening holes that are formed in end portions of the bus bars (32 and 33), and the component's connection part 36B is a connector 36B that is connected to an end portion of the component's wiring member 36. In the present embodiment, the connector 36B is a male connector, and is connected to a female connector 6A of the unit base plate 20. Note that details regarding how the component's wiring members (32, 33, and 36) are routed on the component base plate 30 are omitted.

Next, the following outlines a process of manufacturing the electricity storage pack 100 according to the present embodiment. Note that the process of manufacturing the electricity storage pack 100 is not limited to the following description.

Using an insulative synthetic resin, unit base plates 20 and a component base plate 30 such as those shown in FIGS. 2 and 7 are each molded so as to have a predetermined shape. Next, as shown in FIG. 3, the output bus bars (2 and 3) are attached to each unit base plate 20 using the unit routing grooves (21A and 21B). Also, the inter-module bus bars (4 and 5) are attached to each unit base plate 20 using the unit routing grooves (21A and 21B). Furthermore, the voltage detection lines 6 are attached to each unit base plate 20 using the unit routing grooves (21A and 21B). Similarly, also regarding the component base plate 30, the component's wiring members (32, 33, and 36) are attached to the component base plate 30 using the component's routing grooves (31A and 31B).

Next, the insulation protectors 40A are mounted on the unit base plates 20, the electricity storage modules 50 are mounted on the insulation protectors 40A, and thus electricity storage module units 10 like that shown in FIG. 1 are completed. Also, the insulation protector 40B to which the protection members are attached is mounted on the component base plate 30, and thus the junction box 60 is completed.

Next, as shown in FIG. 5, the two electricity storage module units (10A and 10B) and the junction box 60 are electrically connected to each other using bolts 71 and the connectors (6A, 6B, and 36B), and thus the electricity storage pack 100 shown in FIG. 4 is complete.

In the present embodiment, each electricity storage module unit 10 is provided with the wiring members (2, 3, 4, 5, and 6) that are connected to the electricity storage modules 50, and the wiring connection parts (2A, 3A, 4A, 6A, and 6B) that connect the wiring members (2, 3, 4, and 6) to the wiring members of another electricity storage module unit or to an external electrical component 60. Therefore, it is possible to build an electricity storage pack 100 that has a predetermined capacity, by simply connecting two (a predetermined number of) electricity storage module units (10A and 10B) to each other via bolt fastening holes (2A, 3A, and 4A) and connectors (6A, 6B), which are wiring connection parts. In this regard, it is possible to transport the electricity storage pack 100 by separately transporting each of the electricity storage module units 10, and thus transport efficiency is improved.

Also, it is possible to flexibly route the wiring members (2, 3, 4, 5, and 6) in each unit base plate 20, using the plurality of routing grooves (21A and 21B). In addition, it is possible to connect electricity storage module units 10 that are located away from each other, to each other via a cable or the like that connects the wiring connection parts (2A, 3A, 4A, 6A, and 6B) to each other. Therefore, with an electricity storage module unit 10 according to the present embodiment, it is possible to build an electricity storage pack 100 that can improve installation work efficiency and that is versatile in terms of installation.

Specifically, the signal lines 6, the inter-module bus bars (4 and 5), and the output bus bars (2 and 3) are provided in separate electricity storage module units 10, and therefore, when forming an electricity storage pack 100 using a plurality of electricity storage module units 10, it is only necessary to connect the bolt fastening holes (2A, 3A, and 4A) (the first wiring connection parts) and the connectors (6A and 6B) (the second wiring connection parts) of the electricity storage module units 10. That is, it is unnecessary to route the wiring members such as the signal lines (2, 3, 4, 5, and 6) to assemble the electricity storage pack 100, and thus it is possible to reduce the man-hours required to assemble the electricity storage pack 100.

Also, it is possible to connect two electricity storage module units (10A and 10B) that are adjacent to each other, or the electricity storage module unit 10B and the junction box (external electrical component) 60, to each other using bolts or connectors, for example. Therefore, it is possible to connect two electricity storage module units (10A and 10B) to each other using a simple configuration, and to connect the electricity storage module units 10 to general-purpose electronic components.

Also, the component base plate 30 has the plurality of routing grooves (31A and 31B) that allow the component's wiring members (32, 33, and 36) to be routed such that directions in which the component's wiring members are routed are changeable, and thus it is possible to flexibly route the component's wiring members (32, 33, and 36) using the plurality of routing grooves (31A and 31B). Therefore, the connection position at which the component base plate 30 is connected to an electricity storage module unit 10 is not fixed to a predetermined position on the unit base plate 20. That is, the position to which the component base plate 30 is connected is not limited to the position shown in FIG. 5. For example, in FIG. 5 the component base plate 30 may be connected at a position that is downward (downward indicated by the arrow Y) of the electricity storage module unit 10. Therefore, it is possible to connect the component base plate 30, in other words, the junction box 60, to any position of the unit base plate 20 (the electricity storage module unit 10) depending on how the wiring members of the electricity storage module unit 10 are routed.

Other Embodiments

The present invention is not limited to the embodiment that has been described based on the descriptions above and the drawings, and, for example, the following embodiments are included in the technical scope of the present invention.

The embodiment above describes an example in which the first wiring connection parts are constituted by the connectors (6A and 6B) to which the signal lines 6 are connected, and the second wiring connection parts are constituted by the bolt fastening holes (2A, 3A, and 4A) that are formed in end portions of the inter-module bus bar 4 and the output bus bars (2 and 3). However, the configurations of the first wiring connection parts and the second wiring connection parts are not limited to those in the example. For example, the first wiring connection parts may be receiving connectors that are fixed to the unit base plates 20. Also, the second wiring connection parts may have an insulation cover that covers exposed portions of bus bars.

Figure 8:
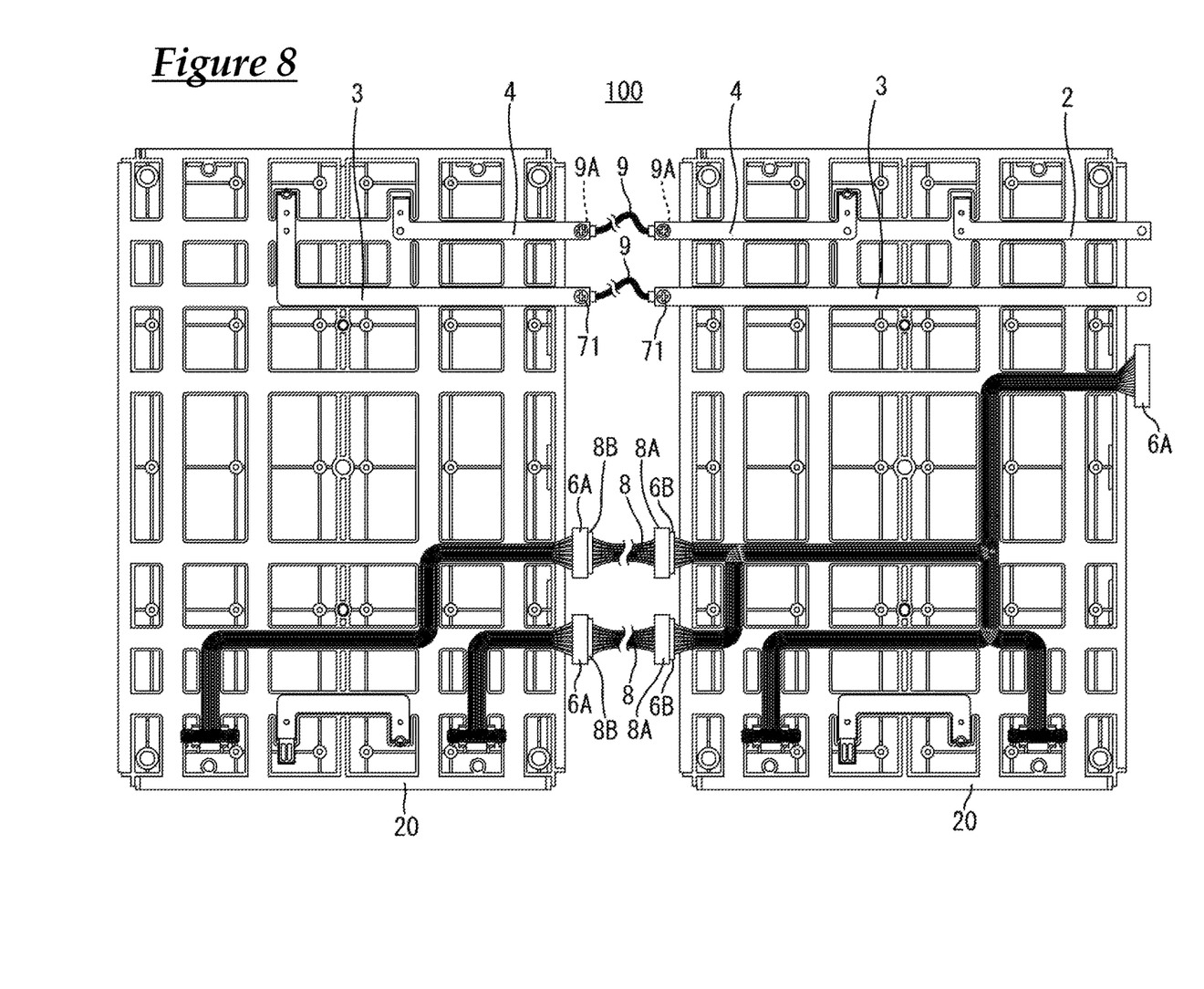
FIG. 8 is a plan view showing another embodiment of the electricity storage pack.

The embodiment above describes an example in which the two electricity storage module units (10A and 10B) are connected to each other by directly connecting the bolt fastening holes (2A, 3A, and 4A) and the connectors (6A and 6B). However, the present invention is not limited to such an example. For example, as shown in FIG. 8, the bolt fastening holes (2A, 3A, and 4A) may be connected to each other via coated power cables (connection cables) 9 that each have bolt fastening holes 9A in two end portions thereof, and the connectors (6A and 6B) may be connected to each other via signal cables (connection cables) 8 that each have connectors (8A and 8B) at the two ends thereof. If this is the case, it is possible to decentralize the electricity storage module units 10 using the connection cables 8, and thus it is possible to realize decentralized installation of the electricity storage pack 100.

Figure 9:
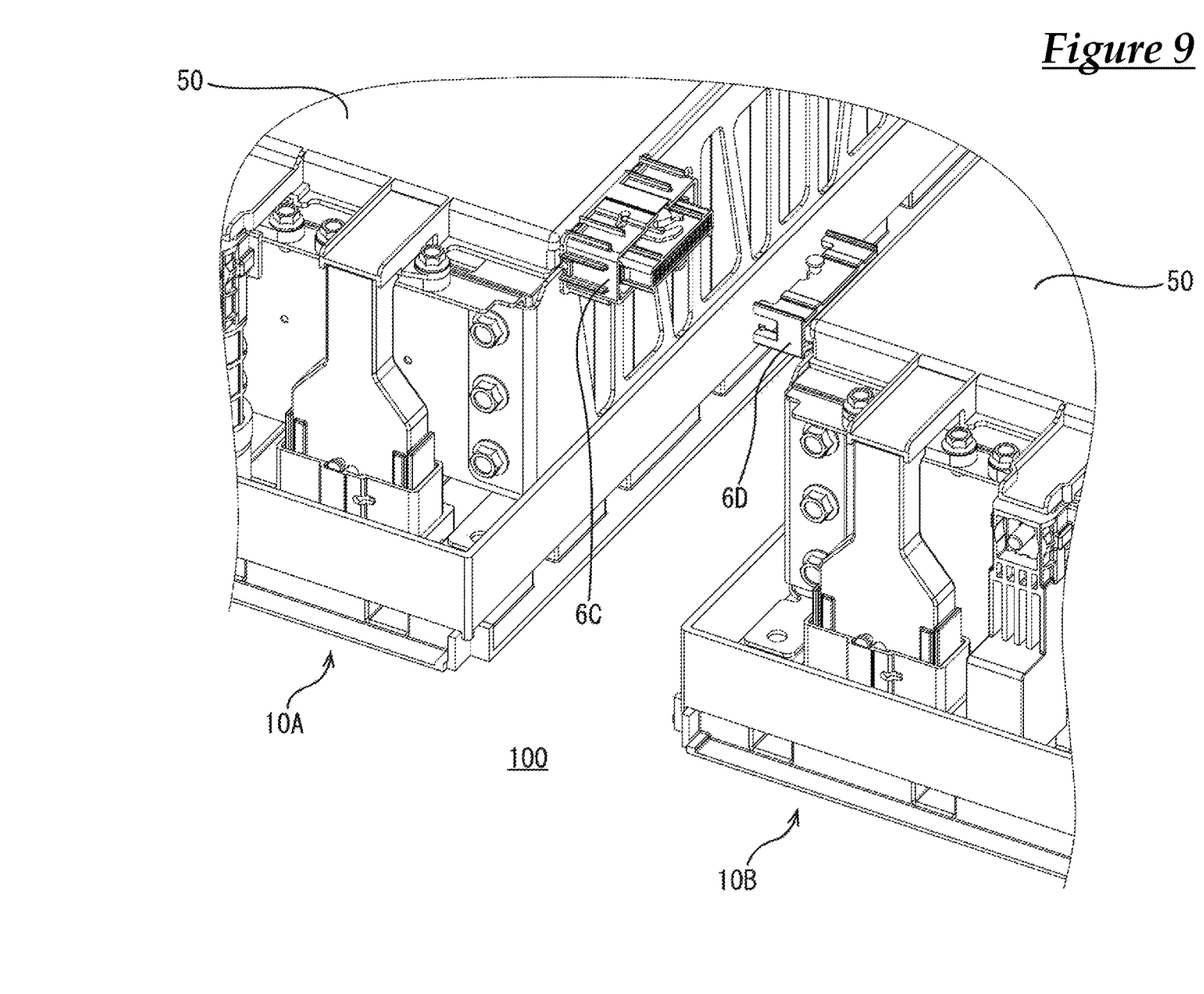
FIG. 9 is a partially enlarged perspective view showing another embodiment of the electricity storage pack.

The embodiment above describes an example in which the connectors (6A and 6B) (the first wiring connection parts) that connect the signal lines 6 to another electricity storage module unit or to an external electrical component are arranged around the unit base plates 20. However, the present invention is not limited to such an example. For example, as shown in FIG. 9, the first wiring connection parts may be constituted by a receiving female connector 6C that is fixed to an upper portion of an electricity storage module 50, and a male connector 6D that is fixed to an upper portion of an electricity storage module 50 and is connected to the receiving female connector 6C. Even if this is the case, the receiving female connector 6C and the male connector 6D may be directly connected to each other, and alternatively the receiving female connector 6C and the male connector 6D may be connected to each other via a connection cable.

The embodiment above shows the output bus bars (2 and 3), the inter-module bus bars (4 and 5), and the voltage detection lines 6 as examples of the wiring members. However, the wiring members are not limited to these examples. For example, temperature detection lines may further be included as the wiring members.

The embodiment above describes an example in which the electricity storage pack 100 includes the junction box (external electrical component) 60. However, this is not essential, and the junction box 60 may be omitted.

The embodiment above describes an example in which the plurality of unit routing grooves (21A and 21B) of the unit base plates 20 and the plurality of routing grooves (31A and 31B) of the component base plate 30 are straight and are arranged so as to form a grid shape. However, the routing grooves are not necessarily arranged so as to form a grid shape. For example, each routing groove may include a curved portion or an inclined portion that is inclined at a predetermined angle.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 2, 3: Output Bus Bar (Wiring Member)
4, 5: Inter-module Bus Bar (Wiring Member)
2A, 3A, 4A: Bolt Fastening Hole (Second Wiring Connection Part)
6: Voltage Detection Line (Signal Line: Wiring Member)
6A: Female Connector (First Wiring Connection Part)
6B: Male Connector (First Wiring Connection Part)
8: Signal Line (Connection Cable)
9: Coated Power Line (Connection Cable)
10, 10A, 10B: Electricity Storage Module Unit
20: Unit Base Plate
21A: Unit Vertical Routing Groove (Routing Groove)
21B: Unit Horizontal Routing Groove (Routing Groove)
30: Component Base Plate
31A: Vertical Routing Groove (Routing Groove)
31B: Horizontal Routing Groove (Routing Groove)
50: Electricity Storage Module
100: Electricity Storage Pack

What is claimed is:

1. An electricity storage module unit that is provided with an electricity storage module that includes a plurality of electricity storage elements, the electricity storage module unit comprising:
    a wiring member that is connected to the electricity storage module;
    a wiring connection part that connects the wiring member to the wiring member of another electricity storage module unit or to an external electrical component; and
    a unit base plate that is a base plate on which the electricity storage module is mounted, and that has a plurality of routing grooves that allow the wiring member to be routed such that a direction in which the wiring member is routed is changeable.

2. The electricity storage module unit according to claim 1,
    wherein the wiring member includes:
    a signal line through which a signal related to a state of the electricity storage module is transmitted;
    an inter-module bus bar that is configured to connect electricity storage modules that are adjacent to each other, to each other; and
    an output bus bar for drawing electrical power from the electricity storage module unit, and
    the wiring connection part includes:
    a first wiring connection part that connects the signal line to the other electricity storage module unit or to the external electrical component; and
    a second wiring connection part that connects the inter module bus bar and the output bus bar to the other electricity storage module unit or to the external electrical component.

3. The electricity storage module unit according to claim 2,
    wherein the first wiring connection part is constituted by a connector to which the signal line is connected, and
    the second wiring connection part is constituted by the inter-module bus bar and a bolt fastening hole that is formed in an end portion of the output bas bar.

4. An electricity storage pack comprising a plurality of electricity storage module units according to claim 1, the plurality of electricity storage module units being connected to each other.

5. The electricity storage pack according to claim 4, further comprising:
    a junction box that is the external electrical component, and that is connected to any one of the electricity storage module units and on which a protection member that protects the electricity storage module is mounted,
    wherein the junction box includes a component base plate on which the protection member is mounted, and
    the component base plate includes:
    a component's connection part that is connected to the wiring connection part of the electricity storage module unit;
    a component's wiring member that is connected to the wiring member via the component's connection part; and
    a plurality of routing grooves that allow the component's wiring member to be routed such that a direction in which the component's wiring member is routed is changeable.

6. The electricity storage pack according to claim 4, further comprising:
    a connection cable that connects the wiring connection parts of different electricity storage module units to each other.

* * * * *